July 3, 1945.   J. LIPPART   2,379,531
WELDING APPARATUS
Filed Sept. 27, 1943   2 Sheets-Sheet 1

INVENTOR
John Lippart
BY
ATTORNEY

July 3, 1945. J. LIPPART 2,379,531
WELDING APPARATUS
Filed Sept. 27, 1943 2 Sheets-Sheet 2

INVENTOR
John Lippart
BY
ATTORNEY

Patented July 3, 1945

2,379,531

UNITED STATES PATENT OFFICE 2,379,531

WELDING APPARATUS

John Lippart, Prospect Park, Pa., assignor to Westinghouse Electric Corporation, East Pittsburgh, Pa., a corporation of Pennsylvania Application September 27, 1943, Serial No. 503,929

2 Claims. (Cl. 113—59)

The invention relates to means for supporting a traversable welding unit in relation to work to be welded, and it has for an object to provide apparatus of this character wherein the welding unit may be readily adjusted for travel along a groove for weld metal.

In the fabrication of various kinds of apparatus or devices by welding together suitable metallic parts, it is frequently advantageous to resort to mechanical control of travel of the welding unit in relation to the work instead of handling the welding unit manually. This is particularly true where a welding groove extends linearly, in which event, to secure travel of the welding electrode along the groove, it is necessary to dispose the guideway for the welding unit and the groove in parallel relation. In accordance with the present invention, a welding unit guideway is provided by a substantially horizontal arm carried by a substantially vertical column, the arm being adjustable vertically along the column and angularly about the vertical axis of the latter to suit the work. With the arm extending radially of the column, it will be apparent that the work would have to be placed on the table so that the groove would also extend radially with respect to the column axis to bring the guideway and the groove into parallelism. The restriction so imposed on groove location would necessitate careful set-up of the work, which may be unwieldy and not readily located or placed in the required position. Furthermore, as firm anchorage of the work to the table is desirable to avoid distortion incident to welding, operations for this purpose increase the difficulty of precise location of the welding groove. To meet this problem, instead of obtaining parallelism by careful location and anchorage of the work on the table, the work is merely firmly anchored in place without regard to parallelism, after which the arm may be adjusted about an additional or vertical axis parallel to the column vertical axis to bring about groove and guideway parallelism. Because of this additional adjustment, it will be apparent that work on a worktable may present a wide range of positions of welding grooves and the arm adjusted to effect parallelism of the guideway and groove.

Accordingly, a further object of the invention is to provide a cantilever arm formed with a guideway for a welding unit and which arm is capable of being raised and lowered and of being adjusted about parallel vertical axes to bring the guideway of the arm readily into parallelism with a desired line of welding.

A further object of the invention is to provide a welding unit guideway arm of the above character capable of adjustment about two vertical parallel axes together with means providing for angular adjustment of the worktable about a horizontal axis.

These and other objects are effected by the invention as will be apparent from the following description and claims taken in connection with the accompanying drawings, forming a part of this application, in which:

Fig. 3 is a fragmentary view showing the worktable and welding unit relation.

Figure 1:
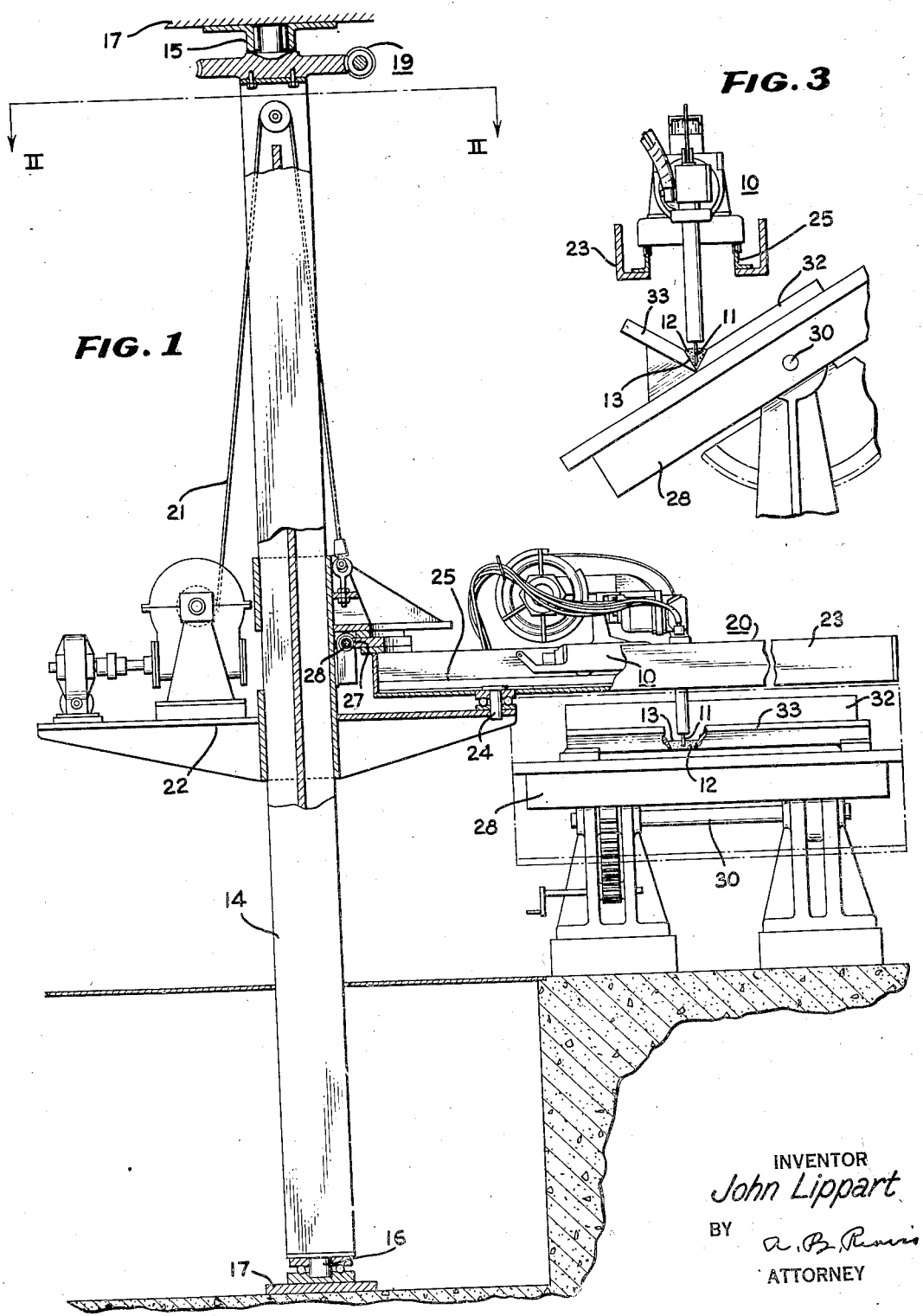
Fig. 1 is a side elevational view of the improved apparatus showing parts in section.
Figure 2:
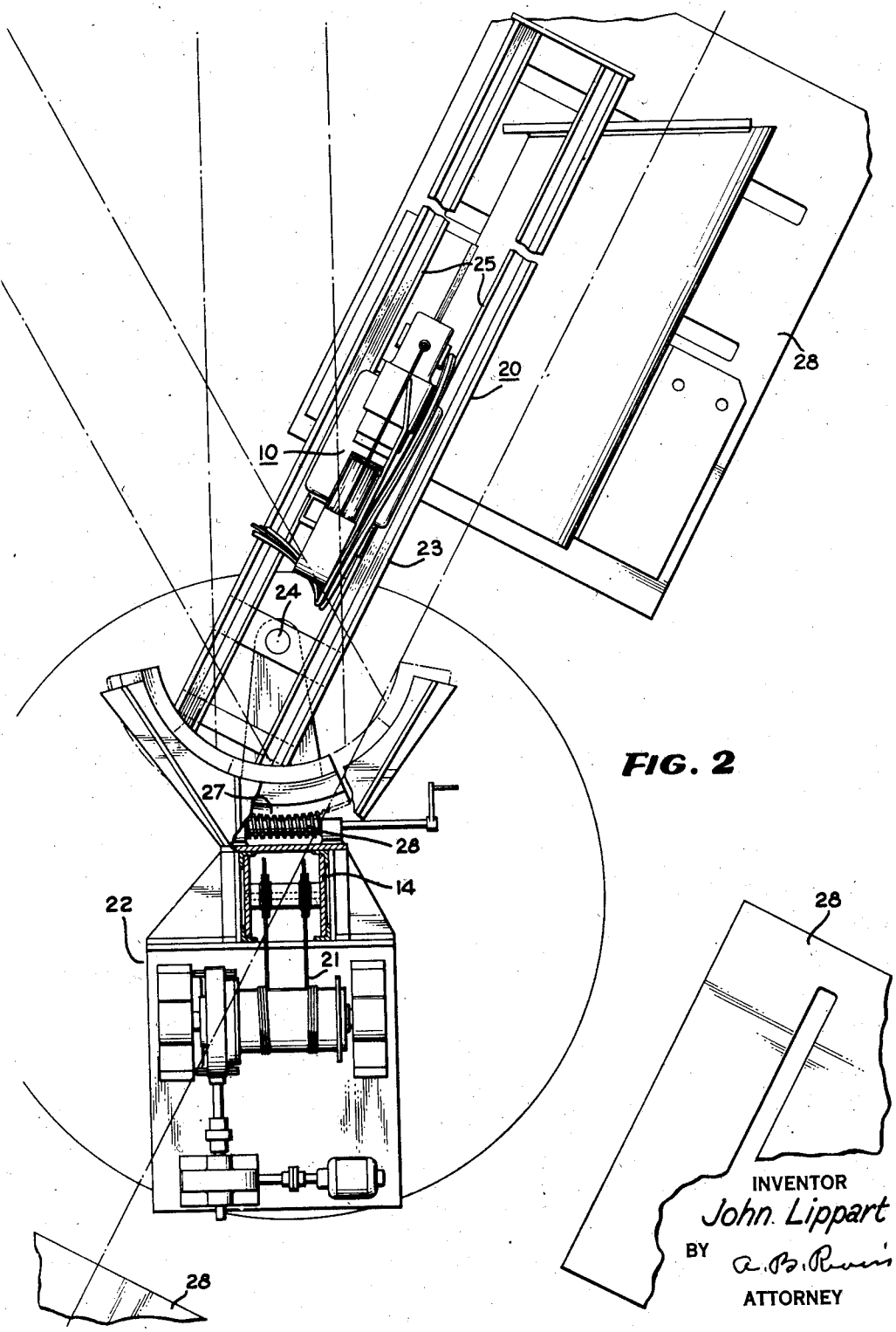
Fig. 2 is a section viewed in the direction of the arrows of line II—II of Fig. 1 and showing the apparatus in plan.

While the invention is applicable for any suitable welding unit, in the drawings, by way of example, there is shown a welding unit, at 10, of well-known type adapted to feed continuously a metallic wire electrode 11 into a body of flux 12 filling a weld groove 13, the electrode, the flux, and the groove surfaces being fused electrically as the electrode is traversed along the groove and through the flux. With my improved type of apparatus, this process of welding may be very conveniently performed, as the welding groove may be readily positioned to open upwardly for the gravitational retention of flux.

The present invention is concerned with apparatus for supporting the welding unit and the work to facilitate travel of the electrode in proper relation to the groove and along the latter. To this end, there is shown a column 14 having upper and lower pivots or trunnions 15 and 16 positioned by suitable stationary structure 17 so as to maintain the axis of angular adjustment of the column substantially vertical.

Any suitable means may be provided to secure angular adjustment of the column about its vertical axis; and, by way of example, there is shown gear means, at 19, which may be operated for this purpose.

The column carries a horizontal arm, at 20, which may be raised and lowered with respect to the column by any suitable means such as the cable 21.

As shown, the arm construction, at 20, is comprised by a support 22 guided by the vertical column for movement therealong and which carries a cantilever arm 23 pivotally connected thereto by swivel means 24 whose axis is vertical or parallel to that of the column.

The relatively long cantilever arm 23 is formed to provide a guideway 25 along which the welding unit, at 10, may be moved horizontally. The length of the guideway 25 is substantially greater than the distance between the vertical pivot axis of the column and the vertical axis of the swivel or pivot means 24. To provide for angular adjustment of the cantilever arm with respect to the support and about the vertical axis of the pivot means 24, the inner end of the arm has attached thereto a worm sector coaxial with the pivot means 24 and which meshes with a worm 26 carried by the support 22 and capable of being turned manually.

A worktable 28 is tiltable about the horizontal axis of the pivot means 30 extending transversely with respect to the column axis and preferably radially of the latter.

From the apparatus so far described, it will be apparent that work, for example the parts 32 and 33, may be firmly clamped in place with respect to the worktable 28, and the latter may be angularly adjusted about its horizontal axis 30 so that the corner groove formed by adjacent parts 32 and 33 opens upwardly, and then the arm 23 may be properly positioned for parallelism of the guideway with the groove.

If the groove should extend radially of the column, then it will be apparent that it is merely necessary to have the arm extend radially of the column axis with proper raising or lowering thereof to suit the work. On the other hand, to avoid the necessity of being compelled to position the work for radial disposition of the groove with respect to the column, the arm is pivotally connected at its inner end to the support, whereby, even though the work may have a wide range of positions either in relation to the column or on the table, the arm 23 may be adjusted to secure parallelism. Thus it will be seen that the arm 23 formed to provide a guideway for the welding unit 10 is capable of three adjustments, first, raising and lowering with respect to the column, second, angular adjustment about the column axis, and, third, angular adjustment about the vertical axis of the pivot 24, with the result that the guideway may be positioned over a wide range to bring it into parallelism with the weld groove.

Where the weld unit deposits flux in a groove, then obviously it is necessary that the groove shall open upwardly so that the flux may be retained gravitationally therein for traversal of the electrode therethrough. It is for this reason that it is desirable to have a tiltable table so that the work may be positioned for upward opening of the weld groove.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In apparatus for supporting a traversable welding unit, a vertical column, a support guided for vertical movement by the column, a cantilever arm carried by the support and pivotally connected to the latter about an axis which is vertical and parallel to the column axis, said cantilever arm being formed with a guideway along which the welding unit is traversed in following a desired path of welding, gearing connecting the support and the arm and operative to cause the latter to move relative to the support about the axis of said pivotal connection, said gearing including a manually-operable driving gear carried by the support, means for raising and lowering the support along the column, and means providing for adjustment of the column about its vertical axis.

2. Apparatus according to claim 1 wherein the gearing is comprised by a sector worm gear attached to the inner end of the cantilever arm in coaxial relation with respect to the pivotal connection and meshing with a manually-operable worm carried by the support.

JOHN LIPPART.